US011507138B2

(12) United States Patent
Lin et al.

(10) Patent No.: US 11,507,138 B2
(45) Date of Patent: Nov. 22, 2022

(54) NOTEBOOK COMPUTER

(71) Applicant: ASUSTEK COMPUTER INC., Taipei (TW)

(72) Inventors: Bin-Yi Lin, Taipei (TW); Ying-Ching Tseng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/308,773

(22) Filed: May 5, 2021

(65) Prior Publication Data
US 2021/0349498 A1 Nov. 11, 2021

(30) Foreign Application Priority Data
May 5, 2020 (TW) .................................. 109114939

(51) Int. Cl.
*G06F 1/16* (2006.01)
*H01Q 1/22* (2006.01)

(52) U.S. Cl.
CPC .......... *G06F 1/1618* (2013.01); *G06F 1/1681* (2013.01); *G06F 1/1683* (2013.01); *G06F 1/1698* (2013.01); *H01Q 1/2266* (2013.01)

(58) Field of Classification Search
CPC ..... G06F 1/1618; G06F 1/1683; G06F 1/1698
See application file for complete search history.

(56) References Cited

U.S. PATENT DOCUMENTS

| 5,936,841 | A | * | 8/1999 | Kantner | .................. | H04B 1/38 |
| | | | | | | 361/737 |
| 6,636,181 | B2 | * | 10/2003 | Asano | .................. | G06F 1/1616 |
| | | | | | | 343/702 |
| 6,959,209 | B2 | * | 10/2005 | Fang | ..................... | G06F 1/1616 |
| | | | | | | 455/571 |
| 7,656,652 | B2 | * | 2/2010 | Moser | .................. | G06F 1/1679 |
| | | | | | | 361/679.27 |
| 7,751,860 | B2 | | 7/2010 | Symons et al. | | |
| 10,200,105 | B2 | * | 2/2019 | Hu | ......................... | H01Q 1/243 |
| 2002/0113741 | A1 | * | 8/2002 | Asano | .................. | H01Q 21/28 |
| | | | | | | 343/702 |
| 2010/0265648 | A1 | | 10/2010 | Hirabayashi | | |
| 2016/0170568 | A1 | * | 6/2016 | Kontkanen | ............. | G06F 3/147 |
| | | | | | | 715/808 |

(Continued)

FOREIGN PATENT DOCUMENTS

| CN | 2876865 Y | 3/2007 |
| CN | 201725246 U | 1/2011 |
| CN | 104898860 A | 9/2015 |

*Primary Examiner* — Adrian S Wilson
(74) *Attorney, Agent, or Firm* — Muncy, Geissler, Olds & Lowe, P.C.

(57) ABSTRACT

A notebook computer is provided. The notebook computer includes a first body, a second body, and a pivotally connection structure. The first body includes a first surface, and the first surface includes a wireless signal transmitting element. The second body includes a second surface, and the second surface includes a wireless signal receiving element. The pivotally connection structure connects with the first body and the second body. When the second body rotates relative to the first body through the pivotally connection structure, the second surface moves toward the first surface, so that the wireless signal receiving element is aligned with the wireless signal transmitting element.

8 Claims, 6 Drawing Sheets

(56) References Cited

U.S. PATENT DOCUMENTS

| | | | |
|---|---|---|---|
| 2018/0038948 A1* | 2/2018 | Kemppinen | G06F 1/1616 |
| 2018/0375189 A1* | 12/2018 | Hawaka | H01Q 1/2266 |
| 2019/0140342 A1* | 5/2019 | Lim | H01Q 1/42 |
| 2019/0237848 A1* | 8/2019 | Ramasamy | G06F 1/1677 |
| 2020/0051468 A1* | 2/2020 | Jung | H01Q 21/30 |
| 2020/0176854 A1* | 6/2020 | Jung | H03F 1/30 |
| 2020/0205073 A1* | 6/2020 | Akkarakaran | G06F 1/1616 |
| 2021/0175608 A1* | 6/2021 | Ramasamy | H01Q 1/48 |

\* cited by examiner

NOTEBOOK COMPUTER

CROSS-REFERENCE TO RELATED APPLICATION

This application claims the priority benefit of Taiwan applications serial No. 109114939, filed on May 5, 2020. The entirety of the above-mentioned patent application is hereby incorporated by reference herein and made a part of specification.

BACKGROUND OF THE INVENTION

Field of the Invention

The invention relates to an electronic device and, more particularly, to a notebook computer.

Description of the Related Art

A traditional notebook computer is assembled by connecting two bodies through a pivotally connection structure. One of the body is equipped with a motherboard and a power supply system as the host part of the notebook computer. The other body is equipped with a display panel. The display panel is connected to the host part through the pivotally connection structure by physical wiring or soft board connection to obtain the display signal and the power supply required for operation. This connection method limits the design of the pivotally connection structure, which in turn affects the tolerance of the pivotally connection structure and the appearance of the product.

BRIEF SUMMARY OF THE INVENTION

A notebook computer is provided. The notebook computer includes a first body, a second body, and a pivotally connection structure. The first body includes a first surface, and the first surface includes a wireless signal transmitting element. The second body includes a second surface, and the second surface includes a wireless signal receiving element. The pivotally connection structure connects with the first body and the second body. When the second body rotates relative to the first body through the pivotally connection structure, the second surface moves toward the first surface, so that the wireless signal receiving element is aligned with the wireless signal transmitting element.

The notebook computer includes the wireless signal transmitting element and the wireless signal receiving element, which are respectively disposed in the first body and the second body to transmit wireless signals. Thereby, there is no need to set up traces or soft boards in the pivotally connection structure. The design of the pivotally connection structure and the appearance design of the notebook computer are more flexible, and the tolerance of the pivotally connection structure is also improved.

DETAILED DESCRIPTION OF THE EMBODIMENTS

The specific implementation will be described in more detail below in conjunction with the schematic diagram. According to the following description and the scope of claims, the advantages and characteristics of the disclosure will be more clear. It should be noted that the drawings are in a very simplified form and all use non-precise proportions, which are only used to conveniently and clearly assist in explaining the purpose of the embodiments of this case.

Figure 1:
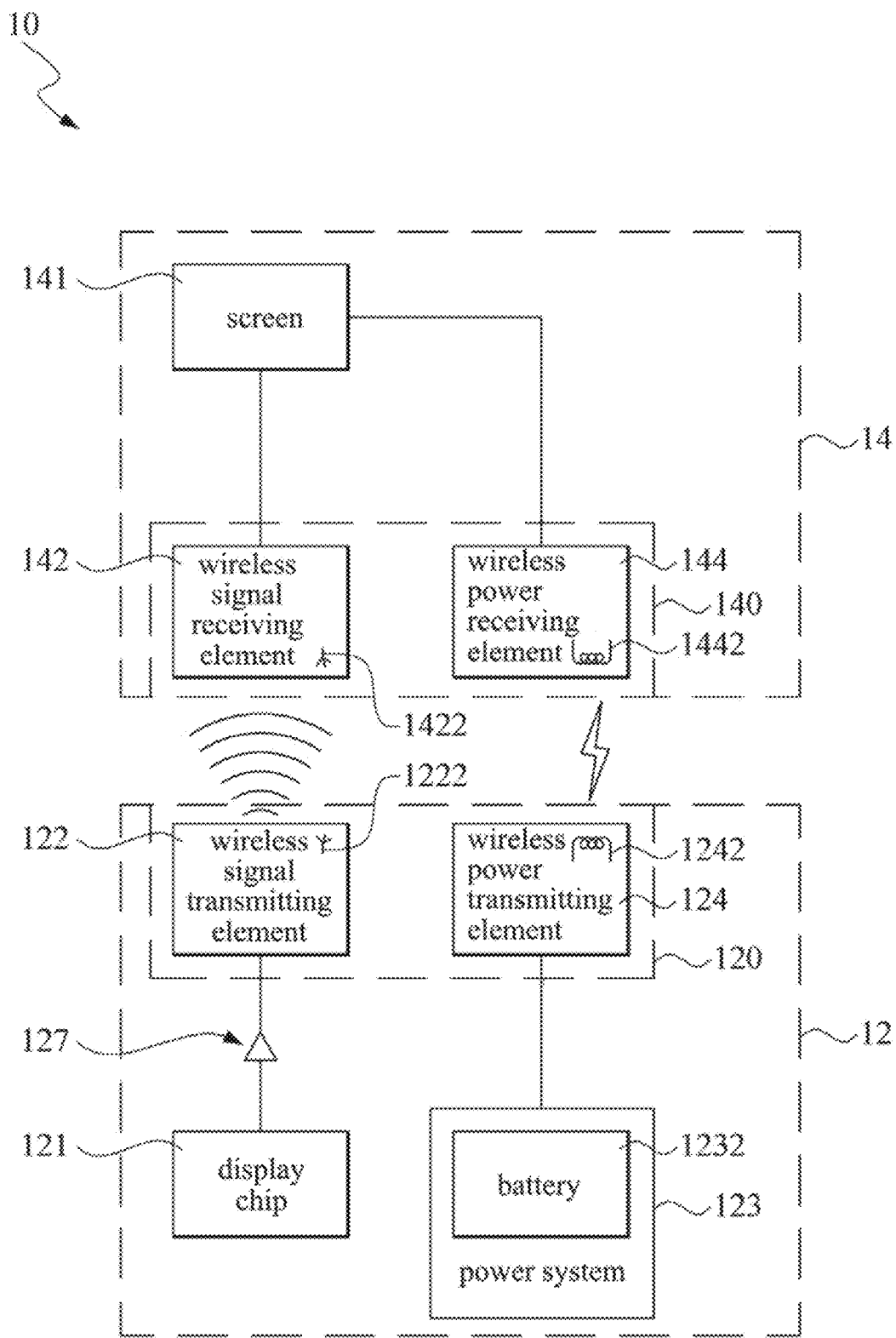
FIG. 1 is a block diagram of a notebook computer of an embodiment.
Figure 2:
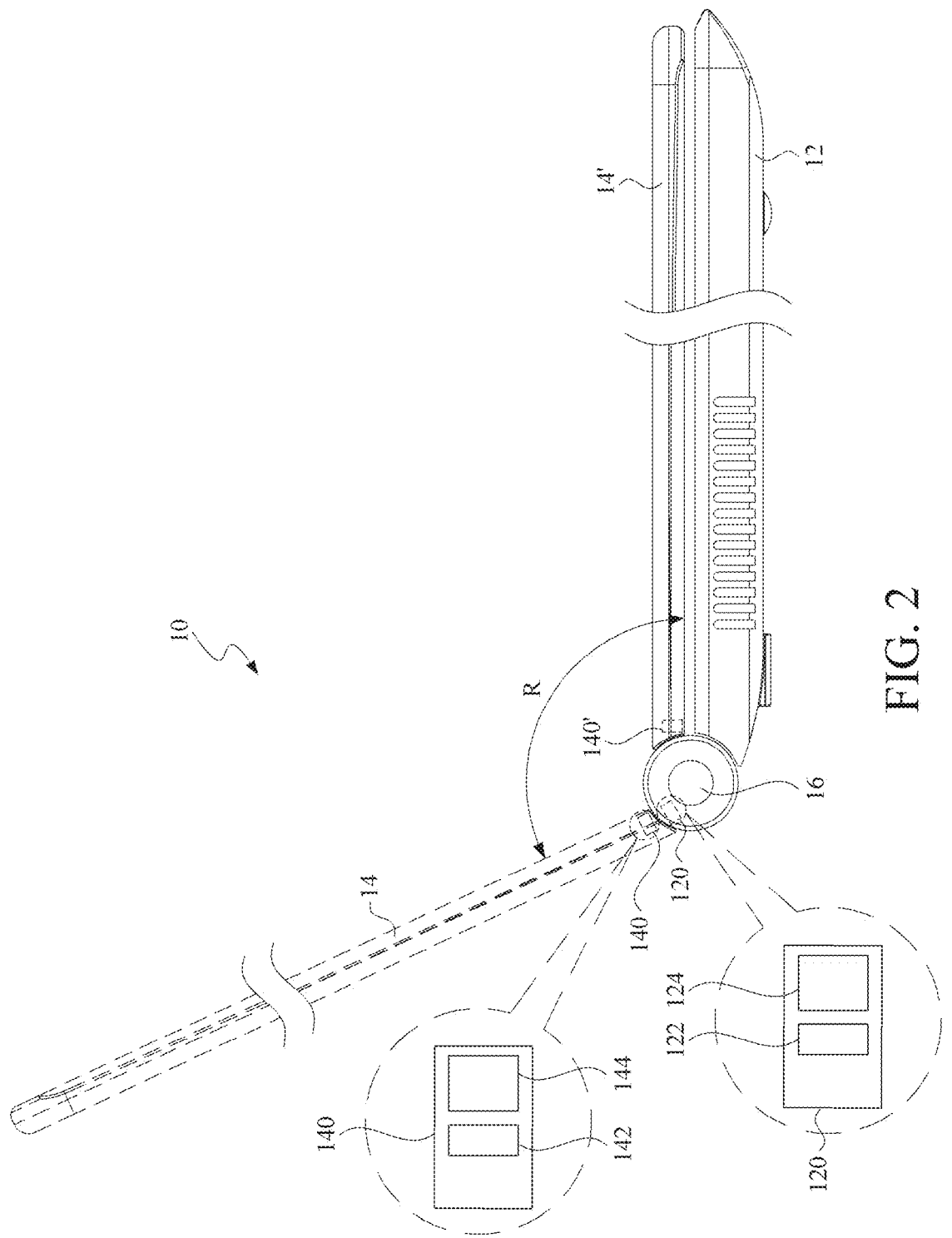
FIG. 2 is a schematic side view of the notebook computer of an embodiment.

FIG. 1 is a block diagram of a notebook computer of an embodiment. FIG. 2 is a schematic side view of the notebook computer of an embodiment.

Please refer to FIG. 2, the notebook computer 10 includes a first body 12, a second body 14 and a pivotally connection structure 16. The pivotally connection structure 16 connects the first body 12 and the second body 14.

Please refer to FIG. 1. The first body 12 includes a display chip 121, a power system 123, a wireless signal transmitting element 122, and a wireless power transmitting element 124. The display chip 121 is used to generate a display signal. The power system 123 is used to provide the power required for the operation of the notebook computer.

The power generated by the power system 123 is not only provided to the system (not shown) within the first body 12, but also transmitted to the wireless power transmitting element 124. In one embodiment, the power system 123 includes a battery 1232 to store power. When there is no external power supply, the battery 1232 provides power to the wireless power transmitting element 124.

The wireless signal transmitting element 122 is electrically connected to the display chip 121 to receive the display signal and convert the display signal into a wireless signal to output. The wireless power transmitting element 124 is electrically connected to the power system 123 for wirelessly transmitting the power provided by the power system 123.

In one embodiment, the wireless signal transmitting element 122 includes a transmitting terminal directional antenna 1222, which is used to transmit the wireless signal in a specific direction. This directional configuration avoids wireless signal overflow and improves the signal strength in a specific direction.

In one embodiment, the transmitting terminal directional antenna 1222 is a microstrip antenna. This microstrip antenna is formed on a printed circuit board. In one embodiment, the wireless power transmitting element 124 includes a transmitting element charging coil 1242, which transmits power outside through magnetic coupling. The transmitting element charging coil 1242 is electrically connected to the power system 123.

Please refer to FIG. 2. Structurally, the casing of the first body 12 includes a first surface 120 near the pivotally connection structure 16. The wireless signal transmitting element 122 and the wireless power transmitting element 124 are disposed at the first surface 120. The wireless signal transmitting element 122 and the wireless power transmitting element 124 are disposed on the inner side of the housing, on the outer side of the housing, or in the opening of the housing at the first surface.

In one embodiment, the wireless signal transmitting element 122 includes a transmitting terminal directional antenna 1222, the strongest radiation direction of which is approximately perpendicular to the first surface 120. In one embodiment, in order to increase the strength of the wireless signal, the first body 12 includes a power amplifier 127. The power amplifier 127 is disposed at the front end of the wireless signal transmitting element 122 for power amplification before wireless signal transmission.

In one embodiment, the wireless power transmitting element 124 includes a transmitting element charging coil 1242. The transmitting element charging coil 1242 is tightly attached to the housing to shorten the wireless power transmission distance and reduce power transmission loss. Moreover, in one embodiment, in order to prevent the display signal from being interfered by wireless power transmission, the wireless signal transmitting element 122 is disposed on an outer side of the wireless power transmitting element 124, and a certain distance exists therebetween.

The second body 14 includes a screen 141, a wireless signal receiving element 142, and a wireless power receiving element 144. The wireless signal receiving element 142 is electrically connected to the screen 141 through a physical wire. The wireless power receiving element 144 is also electrically connected to the screen 141 through a physical wire. The wireless signal receiving element 142 is used to receive the wireless signal transmitted from the wireless signal transmitting element 122, convert it into a display signal, and send it to the screen 141 for display. The wireless power receiving element 144 is used to receive the power provided by the wireless power transmitting element 124 and provide it to the screen 141.

In one embodiment, the wireless signal receiving element 142 includes a receiving terminal directional antenna 1422 for receiving wireless signals from a specific direction. This directional design reduces the impact of noise and ensures the quality of the received wireless signal.

In one embodiment, the receiving terminal directional antenna 1422 is a microstrip antenna. The microstrip antenna is formed on a printed circuit board. In one embodiment, the operating frequency of the wireless signal transmitting element 122 and the wireless signal receiving element 142 is greater than 40 GHz, such as 60 GHz, to provide sufficient bandwidth to transmit the display signal.

In one embodiment, the wireless power receiving element 144 includes a receiving end charging coil 1442 to receive power from the wireless power transmitting element 124. The power received by the receiving end charging coil 1442 is converted and supplied to the screen 141.

Please refer to FIG. 2. The second body in the expanded state (marked as 14) is shown in dashed lines, and the second body in the closed state (marked as 14') is shown in solid lines. The following describes the expanded state.

Structurally, the casing of the second body 14 includes a second surface 140 near the pivotally connection structure 16. The wireless signal receiving element 142 and the wireless power receiving element 144 are provided on the second surface 140. The wireless signal receiving element 142 and the wireless power receiving element 144 are disposed on the inner side of the housing, on the outer side of the housing, or in the opening of the housing at the second surface 140.

In an embodiment, the wireless signal receiving element 142 includes a receiving terminal directional antenna 1422, and its strongest radiation direction is substantially perpendicular to the second surface 140. In an embodiment, the wireless power receiving element 144 includes a receiving end charging coil 1442.

The receiving end charging coil 1442 is tightly attached to the housing to shorten the distance of wireless power transmission and reduce the loss of power transmission. Also, in one embodiment, in order to avoid the display signal from being interfered by wireless power transmission, the wireless signal receiving element 142 is disposed on the outer side of the wireless power receiving element 144, and a certain distance is maintained between the two.

In one embodiment, as shown in FIG. 2, when the second body 14' covers the first body 12, the first surface 120 and the second surface 140' are staggered from each other. At this time, the wireless signal transmitting element 122 and the wireless power transmitting element 124 located at the first surface 120 are not aligned with the wireless signal receiving element 142 and the wireless power receiving element 144 located at the second surface 140'.

As the second body 14' opens upward relative to the first body 12 through the pivotally connection structure 16, the second surface 140' gradually moves toward the first surface 120. When the second body 14 rotates to a preset angle R through the pivotally connection structure 16, the first surface 120 is completely aligned with the second surface 140 and abuts against the second surface 140.

In one embodiment, the preset angle R is 120 degrees. Meanwhile, the wireless signal transmitting element 122 is aligned with the wireless signal receiving element 142, and the wireless power transmitting element 124 is aligned with the wireless power receiving element 144. In this way, the wireless signal from the first body 12 is effectively transmitted to the wireless signal receiving element 142 of the second body 14 through the wireless signal transmitting element 122 of the first body 12, and is provided to the screen 141 for display.

In addition, the power from the first body 12 is also transmitted to the second body 14 through the coupling between the wireless power transmitting element 124 of the first body 12 and the wireless power receiving element 144 of the second body 14 for the operation of the screen 141. Since the first surface 120 is completely aligned and tightly attached to the second surface 140, it is effectively shortening the transmission distance of wireless signals, reducing noise, and preventing wireless signals from being stolen by others. In addition, it also helps to improve the transmission efficiency of wireless power.

In the foregoing embodiment, the second body 14 rotates to the preset angle R through the pivotally connection structure 16 for wireless signal and power transmission, which is not limited herein. In one embodiment, by adjusting the antenna coverage of the wireless signal transmitting element 122 and the wireless signal receiving element 142, the wireless signal is transmitted when the wireless signal receiving element 142 is not sufficiently aligned with the wireless signal transmitting element 122.

In other words, wireless signal transmission is performed to display images when the second body 14 rotates upwards relative to the first body 12 within a certain angle range. In one embodiment, the angle range is 110 degrees to 130 degrees.

Figure 3:
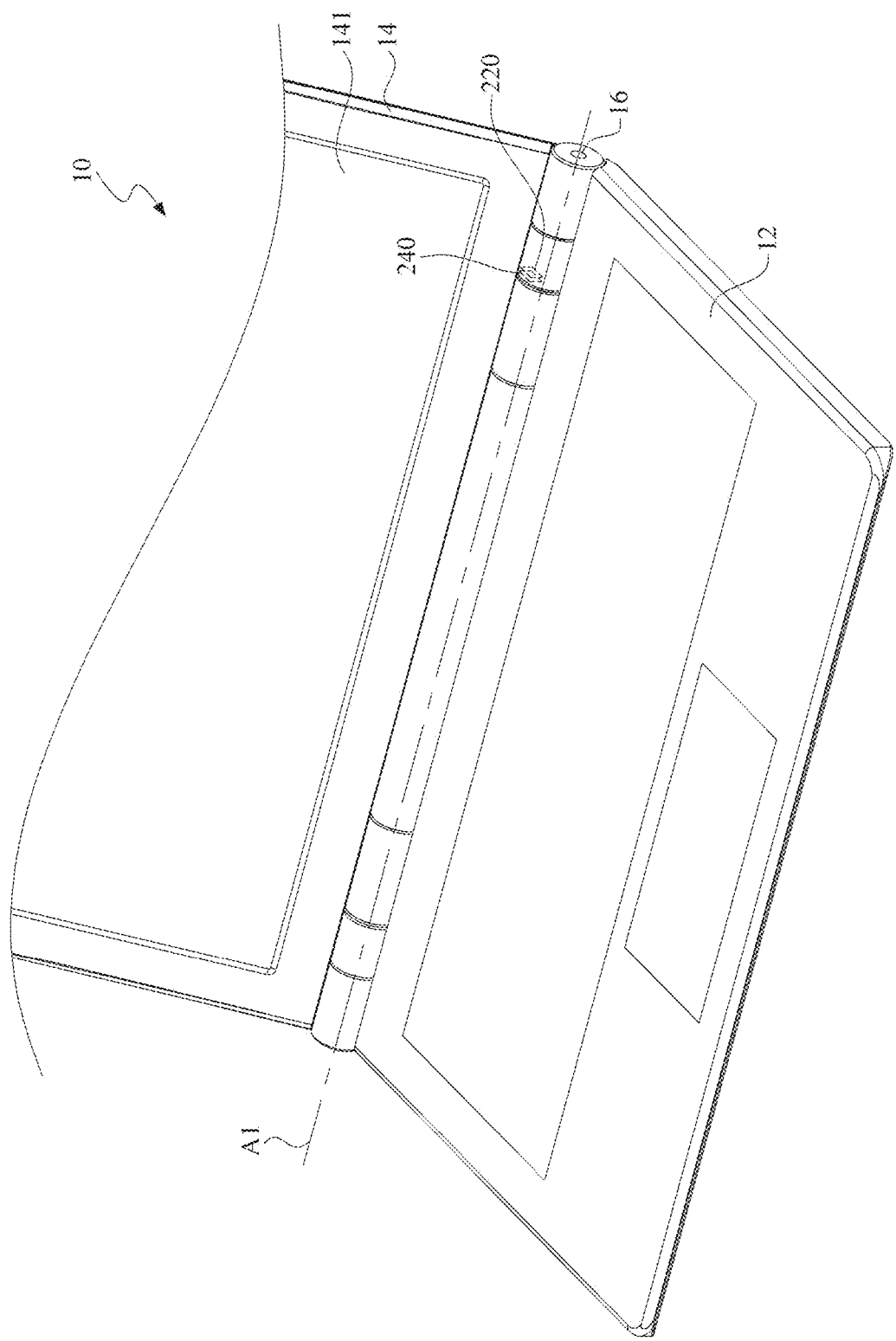
FIG. 3 is a three-dimensional diagram showing the corresponding positions of a first surface and a second surface of an embodiment.

FIG. 3 is a three-dimensional diagram showing the corresponding positions of a first surface 220 and a second surface 240 of an embodiment. The notebook computer 10 shown in the figure is in an expanded state. In one embodiment, as shown, the first surface 220 and the second surface 240 are perpendicular to the rotation axis A1 of the pivotally connection structure 16, and the first surface 220 is parallel to the second surface 240.

Figure 4:
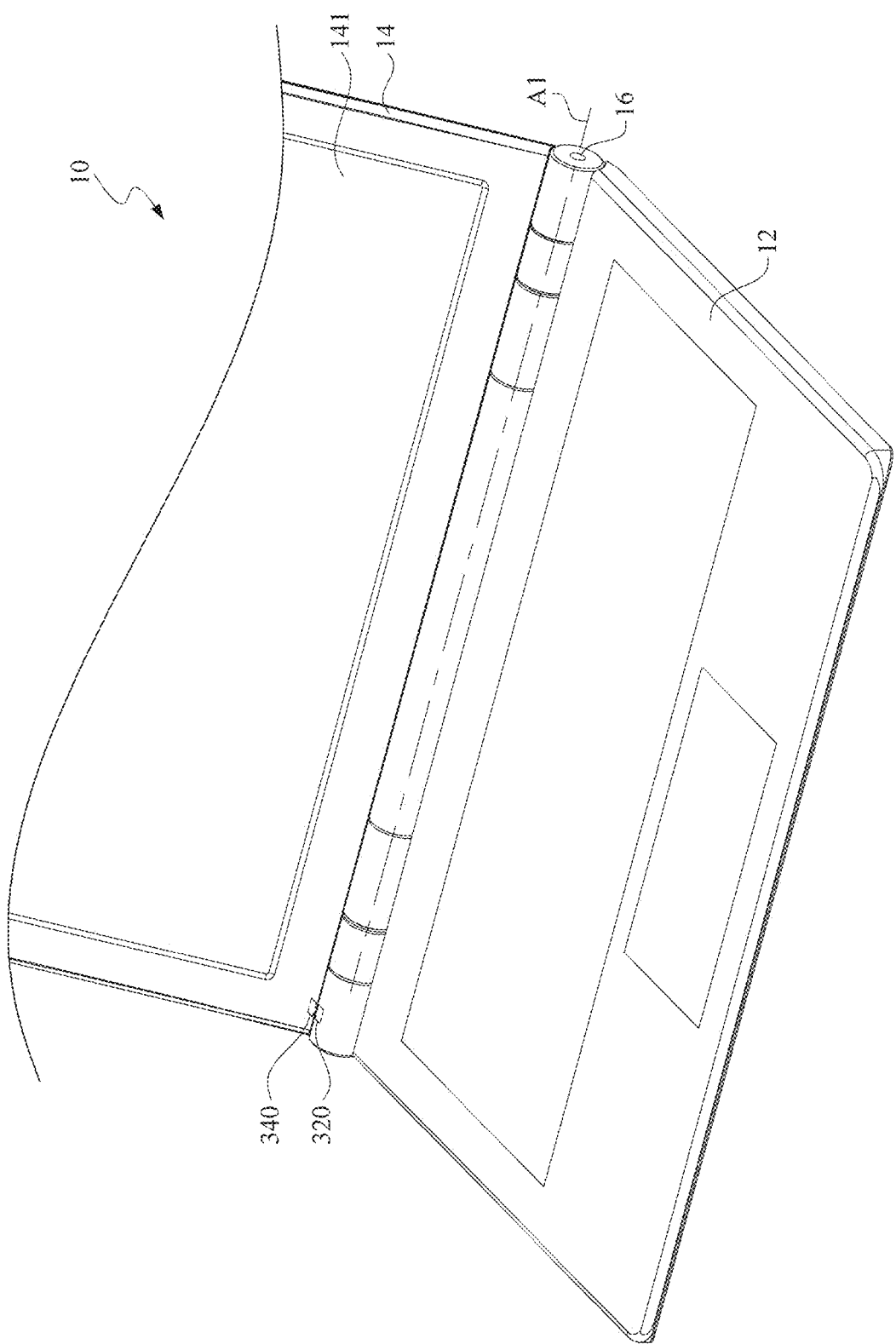
FIG. 4 is a three-dimensional diagram showing the corresponding positions of a first surface and a second surface of another embodiment.

FIG. 4 is a three-dimensional diagram showing the corresponding positions of a first surface 320 and a second surface 340 of another embodiment. The notebook computer 10 shown in the picture is in an expanded state. In one embodiment, as shown, the first surface 320 is parallel to the rotation axis A1 of the pivotally connection structure 16, and the second surface 340 is parallel to the rotation axis A1 of the pivotally connection structure 16. The first surface 320 is located on the upper surface of the first body 12 near the pivotally connection structure 16, and the second surface 340 is located on the inner side of the second body 14 near the pivotally connection structure 16.

Figure 5:
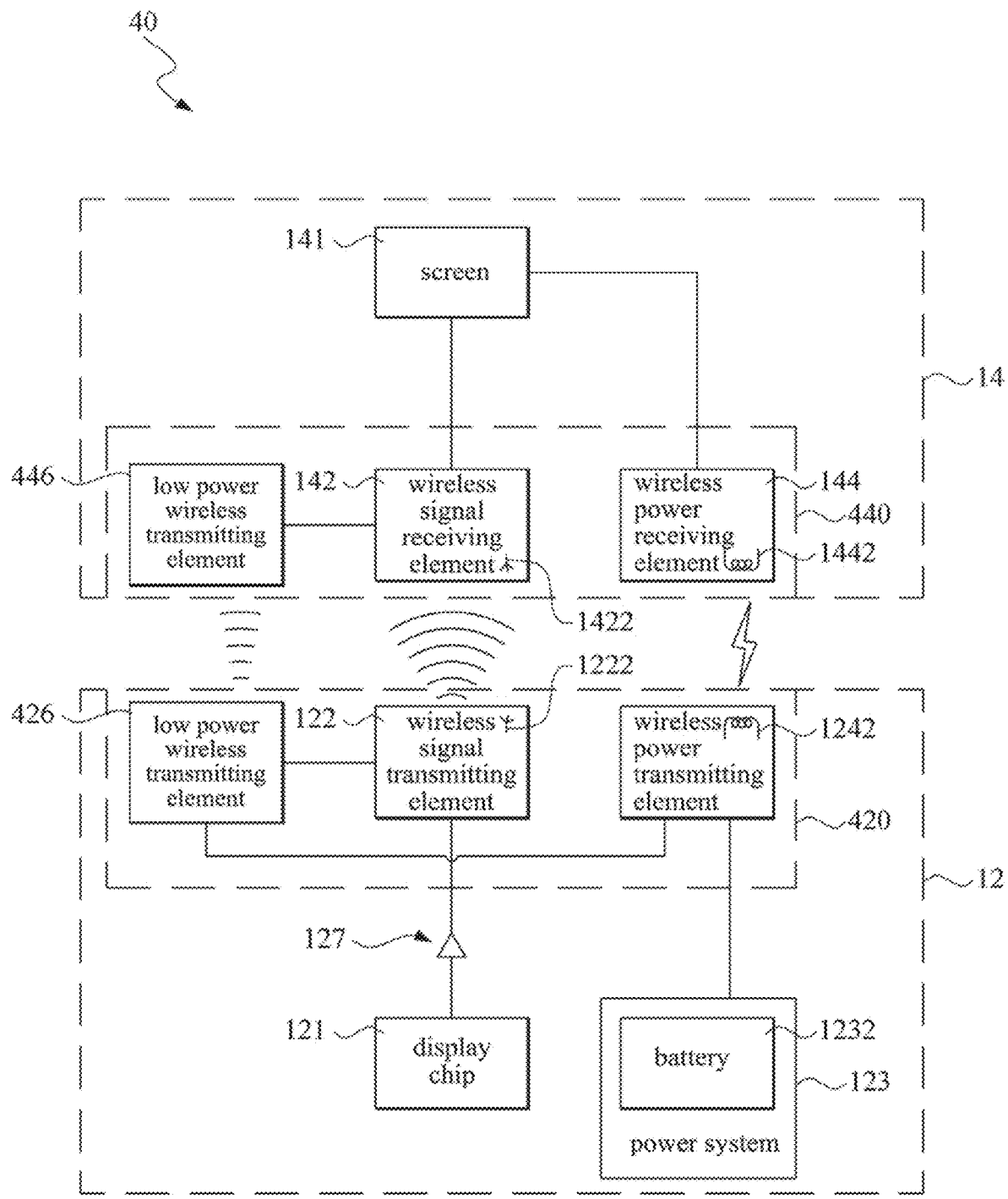
FIG. 5 is a block diagram of a notebook computer of another embodiment.

FIG. 5 is a block diagram of a notebook computer of another embodiment. Compared with the embodiment of FIG. 1, the notebook computer 40 of this embodiment also includes a plurality of a low power wireless transmitting elements 426, 446 arranged on the first surface 420 and the second surface 440, which are used to perform pairing confirmation between the wireless signal transmitting element 122 and the wireless signal receiving element 142, and between the wireless power transmitting element 124 and the wireless power receiving element 144.

The group of the low power wireless transmitting element 426, 446 outputs an activation signal to the wireless signal transmitting element 122, the wireless signal receiving element 142, the wireless power transmitting element 124, and the wireless power receiving element 144 to activate the wireless signal, and further to activate the function of wireless signal transmission and wireless power transmission. In an embodiment, the plurality of the low power wireless transmitting elements 426, 446 comprise Bluetooth elements.

Figure 6:
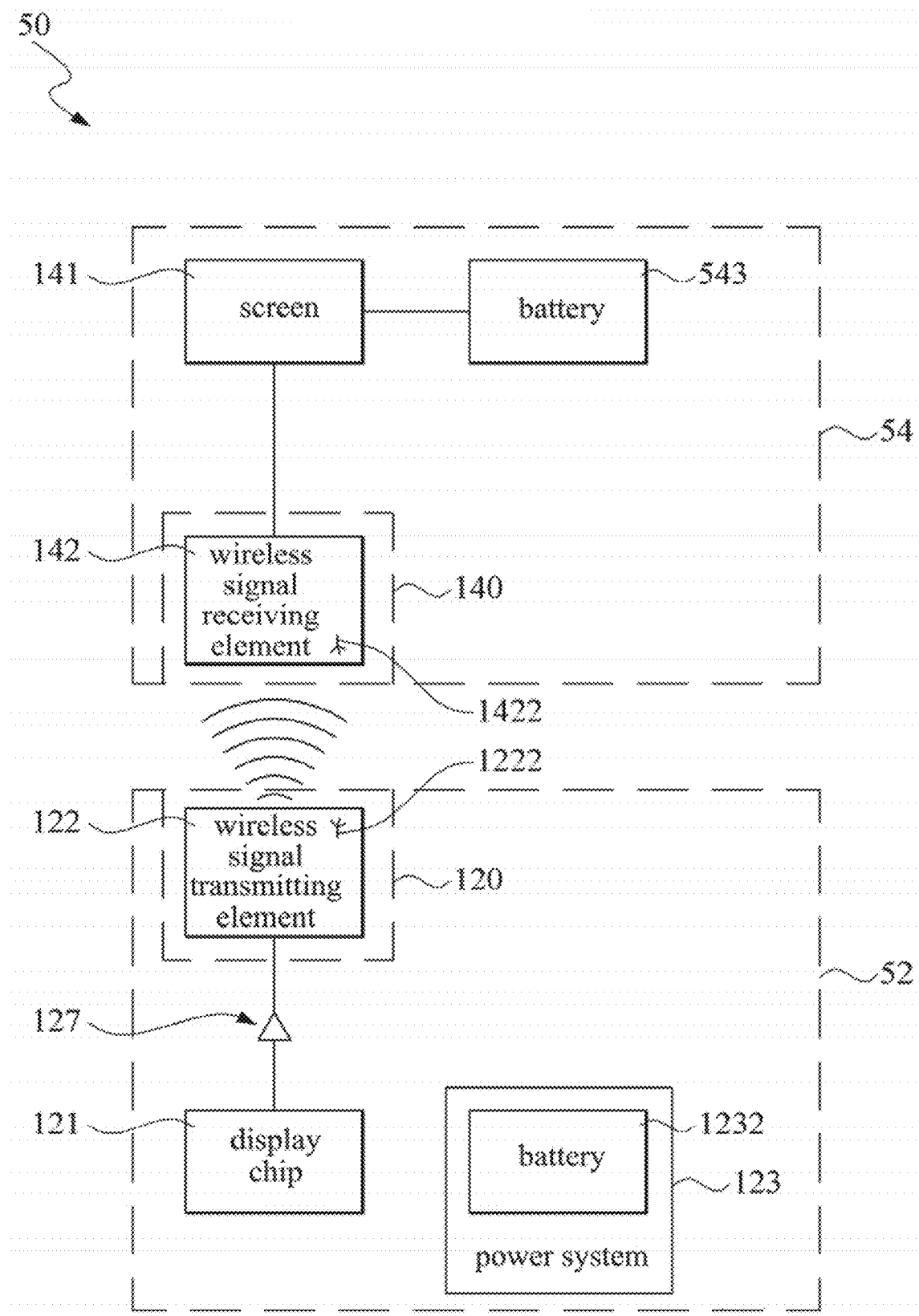
FIG. 6 is a block diagram of a notebook computer of another embodiment.

FIG. 6 is a block diagram of a notebook computer of another embodiment. Compared with the embodiment of FIG. 1, the notebook computer 50 in this embodiment comprises a battery 543 in the second body 54 to provide the power required for the screen 141, and also omits the wireless power transmitting element 124 in the first body 52 and the wireless power receiving element 144 in the second body 14. That is to say, the transmission of wireless signals between the first body 52 and the second body 54 in this embodiment reduces the electronic components around the pivotally connection structure 16, simplifies the circuit design around the pivotally connection structure 16, and provides designers with greater design flexibility.

In one embodiment, the second body 54 includes a connecting base and a tablet computer. The tablet computer is detachably connected to the connecting base. The connecting base is connected to the pivotally connection structure 16. The wireless signal receiving unit 142 is disposed on the connection base to receive wireless signals and transmit them to the tablet computer connected to the connection base.

In some embodiments, the notebook computers 10, 40, and 50 include the wireless signal transmitting element 122 and the wireless signal receiving element 142, which are respectively set in the first body 12, 52 and the second body 14, 54 to transmit wireless signals. In some embodiments, the wireless power transmitting element 124 and the wireless power receiving element 144 are provided to transmit power. In this way, there is no need to set up traces or flexible boards in the pivotally connection structure 16. The design of the pivotally connection structure 16 and the appearance design of the notebook computer 10 are more flexible, and the tolerance of the pivotally connection structure 16 is improved.

Although the present be has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A notebook computer, comprising:
a first body, comprising a first surface and a wireless signal transmitting element and a wireless power transmitting element located on the first surface;
a second body, comprising a second surface and a wireless signal receiving element and a wireless power receiving element located on the second surfaces; and
a pivotally connection structure, connecting with the first body and the second body;
wherein when the second body rotates relative to the first body through the pivotally connection structure, the second surface moves toward the first surface to have the wireless signal receiving element aligned with the wireless signal transmitting element and have the wireless power receiving element aligned with the wireless power transmitting element.

2. The notebook computer according to claim 1, wherein, the wireless signal transmitting element includes a transmitting terminal directional antenna.

3. The notebook computer according to claim 1, wherein, the wireless signal receiving element includes a receiving terminal directional antenna.

4. The notebook computer according to claim 1, wherein, the first surface and the second surface are adjacent to the pivotally connection structure.

5. The notebook computer according to claim 1, wherein, the first surface is parallel to a rotation axis of the pivotally connection structure, and the second surface is parallel to the rotation axis of the pivotally connection structure.

6. The notebook computer according to claim 1, wherein, the second body includes a screen.

7. The notebook computer according to claim 1, wherein, the first body includes a power amplifier, which is disposed at a front end of the wireless signal transmitting element.

8. The notebook computer according to claim 1, wherein, the operating frequency of the wireless signal transmitting element and the wireless signal receiving element is greater than 40 GHz.

* * * * *